Patented Feb. 7, 1950

2,496,342

UNITED STATES PATENT OFFICE 2,496,342

METHOD FOR FORMING SYNTHESIS GAS

Bruce G. Gillespie, Union, N. J., assignor to Standard Oil Development Company, a corporation of Delaware No Drawing. Application September 7, 1945, Serial No. 615,083

2 Claims. (Cl. 252—373)

My present invention relates to improvement in the preparation of hydrocarbon synthesis feed gas, water gas, and other mixtures of carbon monoxide and hydrogen.

During recent years the petroleum and related industries have given a great deal of attention to the possibility of producing or manufacturing gasoline and other hydrocarbon oils, waxes, etc., synthetically, from hydrogen and carbon monoxide. One type of hydrocarbon synthesis using carbon monoxide and hydrogen as feed gas is the Fischer-Tropsch process. According to this process, carbon monoxide and hydrogen are caused to react at elevated temperatures in the presence of a cobalt catalyst, whereupon paraffinic hydrocarbons were formed. Subsequently, it was discovered that a specially prepared iron was a suitable catalyst and that operating it at somewhat higher temperatures and at molecular ratios of about 1/1, of hydrogen to carbon monoxide in the synthesis gas, a liquid product could be obtained which was of fairly high octane rating. At the present time, a great deal of research is being conducted directed toward developing processes in which liquid hydrocarbons may be synthesized from carbon monoxide and hydrogen in a process in which the catalyst, that is, the cobalt or the iron is suspended in the reactants to form a dense suspension of the powdered catalyst in the gasiform reactants. It appears at the present time that the most suitable catalyst for that process is one which contains iron as the essential ingredient, and it further appears that the most suitable ratio of hydrogen to carbon monoxide in the gas fed to the synthesis operation is one which contains about one mol of hydrogen per mol of CO, for such mol ratios lead to the production of liquid hydrocarbons of good anti-detonation qualities, which liquid hydrocarbons are further characterized by the desirable attribute that they are substantially free from oxygenated hydrocarbon compounds.

One of the problems, of course, in hydrocarbon synthesis is that of producing economically and efficiently, a suitable synthesis gas, and my present invention relates to improvements in such synthesis gas production. Speaking generally at first, I wish to set forth that the gist of my invention resides in the concept of producing substantially 1/1 molal ratio of hydrogen and carbon monoxide by reacting a methane gas or a gas consisting predominantly of methane, with carbon dioxide, in the presence of a specially prepared catalyst, comprising essentially metallic copper carried on activated carbon.

The main object of my invention, therefore, is to provide an efficient economical and otherwise satisfactory process for producing substantially equi-molecular proportions of hydrogen and carbon monoxide from a methane-containing gas and carbon dioxide.

A more specific object of my present invention is to produce a synthesis gas for hydrocarbon synthesis in the proper proportions for use in the Fisher synthesis, in which synthesis the active component of the catalyst is metallic iron.

Other and further objects of my invention will appear hereinafter.

One of the most important features of my invention involves the preparation of a catalyst for carrying out the "reformation" of the methane, that is to say, the conversion of methane to CO and hydrogen by treatment with carbon dioxide. In preparing this catalyst, I proceed as follows:

Preparation of copper-carbon catalyst

A suitable quantity of activated carbon of about 4 mesh is placed in a vessel fitted with a means for introducing liquid, and a connection to a vacuum pump. The carbon is heated to 300° to 600° F. for several hours during which time a vacuum is maintained in the vessel. Following this activation and degassing period, the carbon is allowed to cool to a temperature of about 200° F. or lower, the vacuum still being maintained, and enough hot saturated copper nitrate solution is added so that all the carbon becomes immersed in the solution. Air is then admitted, and the carbon remains immersed in the copper solution for an hour. The carbon is removed from the vessel and the excess nitrate solution is drained from it, and it is then heated slowly to about 400° C. to drive off nitrous fumes. Evolution of fumes begins as low as about 140° C., and heating should be continued at such a rate that evolution of gas is not too rapid. When the last of the nitrate has been decomposed, the residual nitrous fumes are displaced with air or nitrogen (to avoid the formation of possible explosive mixtures of hydrogen and nitrogen oxides), and hydrogen is then passed in to reduce the copper oxide. This latter step may be conveniently performed at 400° C. also, although the reduction temperature is not critical. At this temperature, absorption of hydrogen is rapid, and the complete reduction of the CuO can be effected in relatively short time.

This procedure yields a copper-on-activated-carbon catalyst of bulk density about 0.52 gm./ml. which contains about 10 to 15 weight per cent of copper depending upon the concentration of the copper nitrate solution, and upon the temperature of impregnation. The copper is present in a very finely divided state, and in this form, has been found to be particularly suitable for catalytic use.

Salts other than the nitrate can be used, for example, copper formate, copper ammonium hydroxide, copper acetate, and copper sulfate. The nitrate is generally preferred, however, as it is one of the most soluble copper salts, thus giving a higher concentration of copper on the catalyst, and also it is easily decomposed to the oxide and thence to the free metal. Copper sulfate, for example, requires heating to about 650° C. (1202° F.) to form copper oxide.

In order to test the effectiveness of my catalyst I carried out the reformation of the gas which contained approximately one part of $CO_2$ to one part of methane and I set forth below a tabulated form showing the operating conditions and the product analysis:

*Carbon dioxide reforming of methane*

[Copper on activated carbon catalyst]

| Run No. | A | B | C | D |
|---|---|---|---|---|
| Catalyst | none | Cu-C | Cu-C | Cu-C |
| Temperature, °F | 1,400 | 1,290 | 1,290 | 1,350 |
| Pressure, atmospheric. | | | | |
| Feed Rate, v./v./hr | 25 | 67 | 25 | 25 |
| Feed Gas Composition, vol. per cent: | | | | |
| Methane | 55 | 50 | 50 | 50 |
| Carbon Dioxide | 45 | 50 | 50 | 50 |
| Product Gas Analysis, vol. per cent: | | | | |
| Carbon Dioxide | 38.2 | 5.6 | 5.3 | 4.4 |
| Unsaturates | 0 | | | |
| Oxygen | 1.5 | 0.0 | 0.0 | 0.0 |
| Carbon Monoxide | 1.1 | 40.5 | 42.1 | 44.5 |
| Hydrogen | 4.2 | 39.5 | 42.3 | 45.0 |
| Saturates (Methane) | 50.4 | | | |
| Nitrogen | 4.6 | | | |
| Relative Volume, Prod./Feed | 1.0 | | 1.5 | 1.3 |

In the information set forth above, I have found that the same may proceed at somewhat lower temperatures but the optimum temperature is somewhere between 600° and 800° C. and preferably does not exceed 1350° F. The pressure may be atmospheric, superatmospheric or below atmospheric, and the feed rate may vary considerably. The operation is best carried on in a tubular "reformer" furnace, i. e., a well known furnace containing fired tubes in which the catalyst is disposed in the tubes and heat supplied in the spaces surrounding the tubes. The reaction is, of course, endothermic and heat must be added to the reforming furnace, usually by burning a gas.

Having disclosed the nature and purpose of my invention in the best mode in which it can be performed, what I claim is:

1. A method of reforming a gas consisting essentially of methane, which comprises contacting said methane with a gas consisting essentially of $CO_2$ in the presence of a catalyst comprising copper carried on activated carbon at elevated temperatures not exceeding 1350° F. for a sufficient period of time to effect conversion of the reactants into a gaseous mixture containing hydrogen and substantial amounts of carbon monoxide in proportions suitable for the catalytic synthesis of hydrocarbons, and recovering these materials from the reaction.

2. The method claimed in claim 1 in which carbon dioxide and methane are fed into the reaction in about equal molecular proportion and in which the product contains about equal moles of carbon monoxide and hydrogen.

BRUCE G. GILLESPIE.

REFERENCES CITED

The following references are of record in the file of this patent:

UNITED STATES PATENTS

| Number | Name | Date |
|---|---|---|
| 1,520,437 | Pipkin | Dec. 23, 1924 |
| 1,984,380 | Odell | Dec. 18, 1934 |
| 2,064,867 | Woodhouse | Dec. 22, 1936 |
| 2,220,349 | Riblett | Nov. 5, 1940 |
| 2,234,941 | Keith | Mar. 11, 1941 |

FOREIGN PATENTS

| Number | Country | Date |
|---|---|---|
| 602,111 | Germany | Sept. 4, 1934 |